Aug. 11, 1964 J. A. DENNER ETAL 3,144,535
SWITCH RESPONSIVE TO CHANGES IN AMBIENT TEMPERATURE
Filed Aug. 8, 1960 2 Sheets-Sheet 1
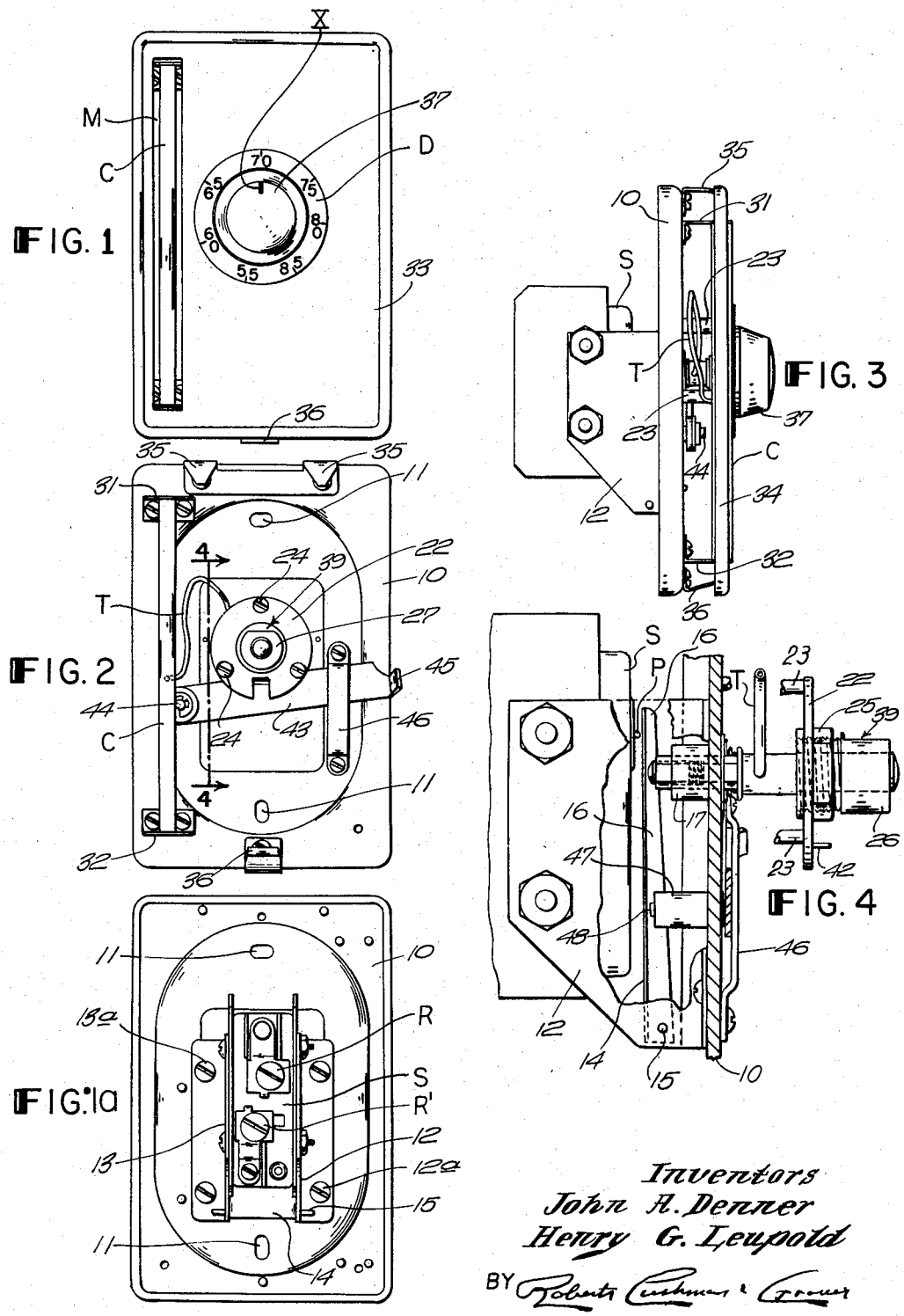
Inventors
John A. Denner
Henry G. Leupold
BY Roberts Cushman & Grover
ATT'YS.

Aug. 11, 1964    J. A. DENNER ETAL    3,144,535
SWITCH RESPONSIVE TO CHANGES IN AMBIENT TEMPERATURE
Filed Aug. 8, 1960    2 Sheets-Sheet 2
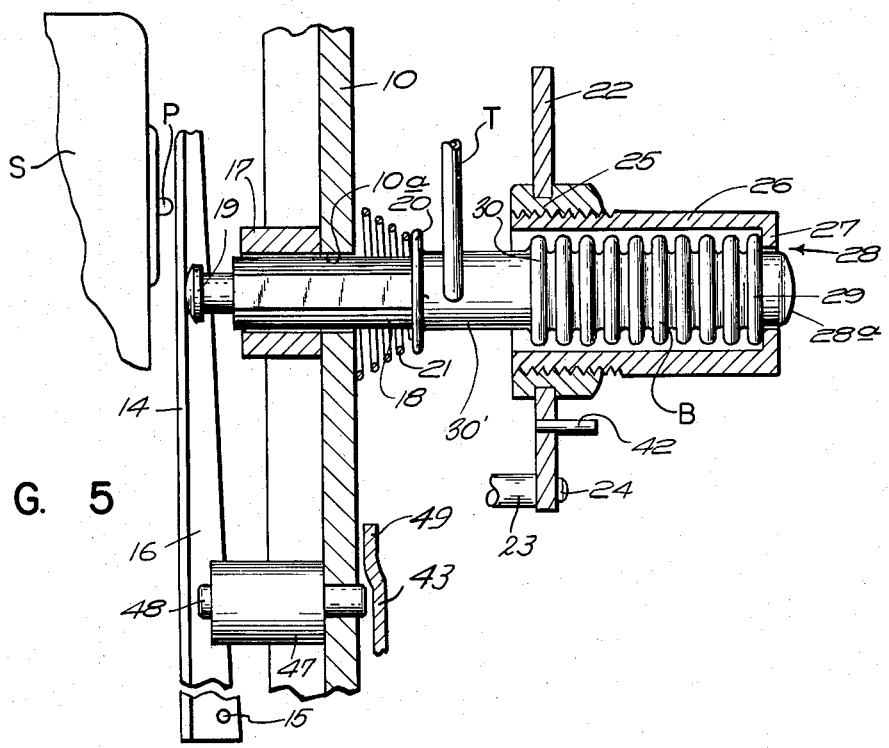
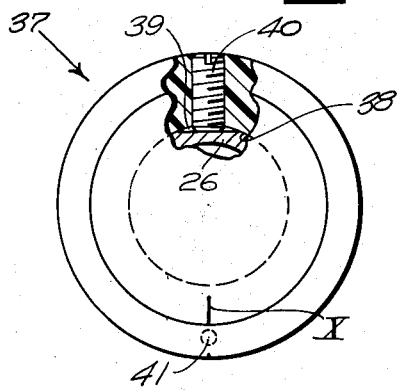
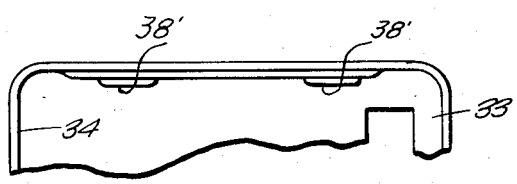
Inventors
John A. Denner
Henry G. Leupold
BY
Roberts Cushman & Grover
ATT'YS.

United States Patent Office 3,144,535
Patented Aug. 11, 1964

3,144,535
SWITCH RESPONSIVE TO CHANGES IN
AMBIENT TEMPERATURE
John A. Denner, West Roxbury, and Henry G. Leupold,
Arlington, Mass., assignors to United Electric Controls
Company, Watertown, Mass., a corporation of
Massachusetts
Filed Aug. 8, 1960, Ser. No. 48,050
4 Claims. (Cl. 200—140)

This invention pertains to thermostats, in particular to a simple type of thermostat primarily designed for use in controlling a heat source for domestic use and for convenience, is hereinafter referred to as a "room thermostat." Devices of this general type customarily comprise an electrical switch, a thermally responsive device for controlling the operation of the switch, and manually operable means for so adjusting the instrument that the switch will be operated at a selected temperature. In some instruments a manually actuatable control is provided for making the instrument inoperative if desired.

Since room thermostats are intended to be installed in living quarters where they are exposed to view, it is important that they shall not detract from the appearance of the room in which they are installed. Thus, such an instrument is made as small as is practical and usually comprises an outer casing of decorative appearance and within which the thermally responsive device is housed so that it is not exposed to view. However, such a location of the thermally responsive device has certain disadvantages, in particular, its enclosure within the casing makes it somewhat less sensitive to change in temperature of the air surrounding the instrument. One object of the present invention is to provide a room thermostat of acceptable size and appearance and wherein the thermally responsive device is exposed to the air outside of the instrument case. In some such instruments the thermally responsive device is a bimetal element which acts directly to operate the switch, but when the bimetal element is made of a size small enough for the intended use, it cannot always be depended upon to exert the requisite force for operating the switch. A further object is to provide a room thermostat of compact design wherein a motor, adequate to actuate the switch is incorporated, but is normally concealed, although readily accessible for inspection without removing the instrument case from the wall upon which it is mounted. A further object is to provide a room thermostat wherein the switch actuating is bodily movable toward or from the actuating pin of the switch thereby to adjust the device to respond to a selected temperature and is so moved merely by turning a knob relatively to a graduated dial. A further object is to provide a room thermostat wherein the motor for actuating the switch is a metallic bellows. A further object is to provide an instrument of the above type having manually actuatable means accessible at the exterior of the instrument case for making the instrument inoperative if desired. Other and further objects and advantages of the invention will be pointed out in the following more detailed description and by reference to the accompanying drawings, wherein:

FIG. 1 is a front elevation of the instrument as it appears when mounted upon the wall;

FIG. 1a is a rear veiw of the instrument showing the switch;

FIG. 2 is a front elevation showing the same instrument, but with the front plate of the instrument case and the adjusting knob removed;

FIG. 3 is a side elevation looking from the left-hand side of the instrument;

FIG. 4 is a view similar to FIG. 3, but to larger scale and with parts broken away and with parts in vertical section, showing some of the details of construction of the instrument;

FIG. 5 is a fragmentary section in the vertical plane of the axis of the actuating knob and showing the metallic bellows for operating the switch;

FIG. 6 is a large scale front view, with parts in section, of the knob, by means of which the thermostat is set to the desired operating temperature; and FIG. 7 is a fragmentary rear elevation of the panel forming the front member of the instrument casing.

Referring to the drawings, the number 10 indicates the rear member or chassis of the instrument case, this member conveniently being made from sheet metal, suitably flanged to provide desired stiffness and having holes, such as indicated at 11 (FIGS. 1a and 2), for the reception of bolts or other attaching means for securing it to a wall or other support. To the rear side of this chassis 10, parallel plates 12, 13 (FIG. 1a) having attaching flanges, are secured, for example by screws 12a, 13a to the chassis and between these plates there is mounted an electrical switch S, preferably of the snap-action type, having a conventional axially slidable actuating pin P (FIGS. 4 and 5) and having the usual terminal posts R and R'. Just in front of the switch S there is arranged a long lever arm 14 which is fulcrumed near its lower edge on a horizontal pin 15 having its opposite ends disposed in holes in the members 12 and 13 respectively. This lever may, for example, be of sheet metal, having stiffening flanges 16 (FIG. 4) at its opposite edges, and extends upwardly to a height such that a portion of its rear face is directly in front of the forward end of the switch actuating pin P.

The chassis 10 has an aperture 10a (FIG. 5) approximately midway between its lateral edges and, as here shown, with its axis spaced a short distance below that of the switch pin P. Coaxial with this opening 10a there is arranged a bearing member 17 which is fixed to the rear surface of the chassis 10 and which has a polygonal bore in which there slides a member 18 of a complementary polygonal shape, this arrangement being such that the member 18, while capable of sliding axially, may not rotate. The rear end of this member 18 is provided with a rearwardly projecting nib 19 whose end is directed toward the forward face of the lever 14.

At its forward end the polygonal member 18 is provided with an abutment flange 20. A compression spring 21, encircling the member 18, bears at one end against this abutment flange and at its opposite end against the chassis 10, the spring thus tending to move the member 18 forwardly, that is to say, away from the lever 14.

A part 22 (FIGS. 2, 4 and 5) here shown, has a disc-like annulus, is secured to the forward ends of three fixed posts 23 projecting forwardly from the chassis 10 and having screw-threaded bores at their forward ends for the reception of screws 24 by means of which the part 22 is fixedly secured to the posts. The part 22 has a central opening in which there is fixed an internally screw-threaded bushing 25 (FIG. 5) having forward and rearward radial flanges which receive between them the edge of the part 22 and which may be welded or otherwise attached to the part 22 so that the part 25 may not rotate. An externally screw-threaded tubular bellows housing 26 has threaded engagement with the bushing 25 so that by rotating the housing 26 it may be moved bodily forwardly or rearwardly relatively to the part 22. The housing 26 has a radial abutment flange 27 at its forward end defining a central opening 28 which receives a positioning boss 28a projecting forwardly from the forward, normally stationary head 29 of the metallic bellows B, the rear or movable head of this bellows being fixed to a tubular stem 30¹ (FIG. 5) whose rear end is integral with, or otherwise fixedly united, to the forward end of member 18 so that rearward movement of the head 29 of the bellows moves the nib 19 toward the lever 14.

A flexible conduit T is connected at one end to the tubular stem 30¹ and communicates with the interior of the bellows B, its other end communicating with the interior of a fluid-tight container or capsule C (FIG. 1) which contains a fluid having a high coefficient of thermal expansion. As shown in FIGS. 2 and 3, this capsule is mounted upon the chassis 10 between two brackets 31 and 32 which project forwardly from the chassis. The capsule is supported by these brackets so that it is spaced forwardly from the chassis 10 as shown in FIG. 3.

The casing of the instrument also comprises a front panel 33 (FIG. 1), desirably of sheet metal, although it is contemplated that this panel may be of plastic material, for example. Desirably the panel 33 has a rearwardly directed marginal stiffening flange 34, and the panel is normally held spaced forwardly from the chassis by means of brackets 35 and 36 (FIG. 2), fixed to the chassis. The upper brackets 35 are spaced apart transversely of the chassis and are provided with slots (not shown) designed to receive hook members 38' (FIG. 7) directed downwardly from the upper flange of the panel 33. The lower bracket 36 is of resilient material and is so shaped that when the parts are assembled its forward end bears with resilient pressure against the lower part of the flange 34 of the panel 33, thus normally holding the panel in place but permitting its ready removal to give access to the parts located behind the panel.

The panel has a vertical elongate opening M, here shown as near its left hand edge (FIG. 1) and the brackets 31 and 32, which support the capsule C, are so located and project forwardly to such a distance that the capsule is positioned within this opening M. The capsule C is thus fully exposed to the air which surrounds the instrument, it being noted that the instrument case has no side walls so that a free circulation of air past the capsule is provided.

For rotating the bellows B, a manual actuatable knob 37 is provided, this knob having a central socket 38 (FIG. 6) at its rear side designed to receive the forward portion of the bellows housing 26 with a snug fit. The housing 26 is provided at one side with a flat external surface 39 (FIGS. 2 and 6) and the knob is provided with a set-screw 40 which, when engaged with the flat surface 39, holds the knob in position and contrains the housing 26 to turn the knob.

The panel 33 is provided with an opening, coaxial with bellows B, through which the forward portion of the housing 26 projects and surrounding this opening there is a dial D (FIG. 1), here shown as integral with the panel, and having graduations numbered to designate temperatures. The knob 37 is provided with an index element X designed for cooperation with the graduations of the dial in setting the instrument to operate at a given temperature, it being noted that this knob is at the front of the panel 33 when the parts are assembled and not only acts as a controller for setting the instrument, but also houses the bellows B which constitutes the motor for operating the switch. In order to limit the rotation of knob 37 so that it cannot be rotated more than 360°, the knob is provided with a pin 41 (FIG. 6) projecting from its rear face and which is engageable with a fixed stop lug 42 projecting forwardly from the part 22.

Since, at times, it may be desirable to make the instrument inoperative, for instance when the heating system is to be shut off, as for example in the summer time, means is provided for temporarily holding the switch pin P in its most rearward position which is the position which corresponds to an open circuit through the switch. For this purpose there is provided a lever 43 (FIG. 2) pivoted to swing about a pin 44 (FIG. 2) projecting forwardly from the chassis 10, the lever extending across to the opposite side of the chassis where it has a lug 45 forming a handle by means of which it may be swung. To insure that this lever shall swing in the desired vertical plane, a retaining member 46 is arranged to bridge the lever near its free end.

At a point, here shown (FIG. 5) as below the member 18, the chassis 10 is provided with a bushing member 47 fixed to its rear surface and providing a guide opening for a slidable pin 48 whose rear end is directed toward the forward face of the lever 14. The lever 43 is provided with an offset or cam portion 49 (FIG. 5) such that when the lever 43 is moved downwardly, it forces the pin 48 rearwardly and so swings the lever 14 as to move the switch pin to its rearmost limit. The cam element 49 is so devised that when the lever 43 is moved downwardly, the parts remain in this position until the lever is raised. When the lever is in its lowered position the bellows B is ineffective to actuate the switch pin P.

When the lever 43 is in its upper or normal position as shown in FIG. 2, the spring 21 urges the member 18 forwardly, thus compressing the bellows and allowing the switch pin P to move forwardly to the extent permitted by the nib 19, in accordance with the prevailing ambient temperature. Since the rotation of the knob 37 has the effect of moving the bellows B bodily front or rear, the initial position of the nib 19 will vary according to the setting of the knob 37 and thus the apparatus will call for heat according as the index X on the knob is set to one or another temperature on the dial.

It will be appreciated that the device thus provided is simple in construction; provides powerful motor means for actuating the switch pin; exposes the thermally responsive element freely to the ambient temperature; permits ready access to the parts behind the front panel and even, while the panel is assembled with the chassis, affords easy access to the motor device B, and further, that these mechanical advantages are embodied in an instrument of simple and pleasing appearance whose presence would not detract from the appearance of the room in which it may be installed.

While one desirable element of the invention has herein been illustrated and described by way of example, it is to be understood that the invention is broadly inclusive of any and all modifications falling within the scope of the appended claims.

We claim:

1. A room thermostat comprising a casing having a chassis designed to be fixed to a wall, an electrical switch mounted on the chassis and having an axially movable actuating pin whose axis is perpendicular to the wall when the chassis is fixed to the latter, a metallic bellows arranged forwardly of the switch with its axis perpendicular to the wall, a capsule containing a fluid having a high coefficient of thermal expansion, a flexible conduit connecting the interior of the capsule with the interior of the bellows, said bellows having heads at its opposite ends, the head at the rear end being movable, a lever pivotally mounted on the chassis, so arranged that the movable bellows head may contact one side and the pin may contact the other, for transmitting motion from said movable head to the switch pin, a spring tending to move the movable head of the bellows away from the switch, a housing surrounding the bellows having an annular flange at its forward end against which the forward head of the bellows bears, said housing being externally threaded for engagement with the chassis and rotatable to move the abutment and hence the bellows bodily toward or from the switch; the instrument casing comprising a front panel spaced forwardly from the chassis, having an opening through which the housing projects and an opening within which said capsule is mounted with its front, back and sides exposed, said panel having graduations indicating different temperatures surrounding the opening through which the housing projects, a manually-adjustable knob fixed to the housing, bearing an index cooperable with said graduations whereby the housing may be rotated to move the bellows bodily toward the switch thereby to determine the temperature at which the switch shall be actuated, said switch being arranged so that the circuit controlled thereby is broken by rearward motion of its actuating pin, a movable member engageable with the same side of the pivoted lever as the movable bellows head, and an actuating lever for moving said movable member so as to move the pivoted lever into operating contact with the switch pin and to hold it there temporarily thus making the instrument inoperative.

2. A wall thermostat comprising a casing adapted to be secured to a wall, said casing having a rigid chassis and a cover panel secured in spaced relation to the chassis providing a shallow open-sided chamber between them and said cover panel containing a central opening and a long narrow opening along one side, a switch secured to the rear side of the chassis with its operating nib projecting forwardly toward the back of the chassis, a lever pivotally mounted on the back of the chassis with an end adjacent the switch-operating pin, a bearing opening in the chassis in alignment with the opening in the cover, a motor having an expansible bellows portion and heads at its opposite ends, said motor being supported with the head at one end extending through the bearing into engagement with the lever and with the expansible portion and other head projecting forwardly through the opening in the panel, a closely fitting cap disposed about the expansible portion, said cap having an outer end opening in which the other head is engaged and being rotatably threaded to the chassis to enable axial movement thereof perpendicular to the chassis and hence bodily movement of the motor perpendicular to the lever, and providing means which excludes contact of the motor with the ambient atmosphere, a bulb mounted in the narrow opening in said panel with its edges spaced therefrom so that it is exposed at the front, back and sides to the ambient atmosphere, and a capillary tube extending from the bulb to the motor for effecting expansion thereof in response substantially exclusively to the rise in temperature of the ambient atmosphere surrounding the bulb.

3. A wall thermostat comprising a chassis adapted to be secured to a wall, a cover secured to the chassis in spaced parallel relation thereto providing a shallow chamber therebetween open at its opposite sides, said cover containing substantially centrally thereof a center opening and along one of its sides a narrow rectangular opening, a switch secured to the rear side of the chassis with its operating pin projecting forwardly toward the chassis, a rigid lever pivotally supported at the rear side of the chassis with its distal end opposite the switch-operating pin, an internally threaded tubular bushing fixed in the central opening in the cover, a cylindrical cap partially closed at one end and open at the other and having threads at its open end screwed into the bushing externally of the cover for axial adjustment perpendicular to the cover, a bearing in the chassis concentric with the bushing, an elongate element disposed in the chamber having one end extending through the bearing into a position adjacent the lever intermediate the pivot and the switch-actuating pin and its opposite end engaged with the opening in the cap, said element being slidably supported in the chassis by said bearing and said cap being threaded into the cover and rotatable to move the element toward and away from the switch, the part of the element situated within the chamber being hollow and the part within the cap being axially expansible and in communication with the hollow part, spring means operating between the bearing and an abutment on the hollow part of the element to hold the part extending through the bearing retracted from the lever, an elongate bulb supported in the rectangular slot in the cover with a clearance at its sides and exposed at the front and back to the ambient atmosphere, said bulb containing an expansible fluid and a capillary tube connecting the bulb to the hollow part of the element situated between the expansible part and the bearing.

4. A wall thermostat according to claim 3, wherein the part of the elongate element extending through the bearing is non-rotatably engaged therewith.

References Cited in the file of this patent

UNITED STATES PATENTS

| 2,273,375 | Ray | Feb. 17, 1942 |
| 2,520,872 | Zuehlke | Aug. 29, 1950 |
| 2,792,475 | Sweger | May 14, 1957 |
| 2,852,642 | Cromwell | Sept. 16, 1958 |
| 2,856,474 | Norris | Oct. 14, 1958 |
| 2,868,928 | Strobel et al. | Jan. 13, 1959 |
| 2,946,864 | Marion | July 26, 1960 |
| 3,040,148 | Lawson | June 19, 1962 |

FOREIGN PATENTS

| 626,843 | Great Britain | July 21, 1949 |
| 732,120 | Great Britain | May 28, 1953 |